(12) United States Patent
Kanda

(10) Patent No.: US 10,889,188 B2
(45) Date of Patent: Jan. 12, 2021

(54) DRIVE CONTROL DEVICE FOR VEHICLE WITH INDEPENDENTLY DRIVEN WHEELS

(71) Applicant: NTN CORPORATION, Osaka (JP)

(72) Inventor: Takeshi Kanda, Iwata (JP)

(73) Assignee: NTN CORPORATION, Osaka (JP)

( * ) Notice: Subject to any disclaimer, the term of this patent is extended or adjusted under 35 U.S.C. 154(b) by 223 days.

(21) Appl. No.: 16/101,017

(22) Filed: Aug. 10, 2018

(65) Prior Publication Data

US 2018/0345796 A1 Dec. 6, 2018

Related U.S. Application Data

(63) Continuation of application No. PCT/JP2017/004650, filed on Feb. 8, 2017.

(30) Foreign Application Priority Data

Feb. 12, 2016 (JP) .................................. 2016-024414

(51) Int. Cl.
*B60L 3/10* (2006.01)
*B60L 7/10* (2006.01)
(Continued)

(52) U.S. Cl.
CPC .............. *B60L 3/106* (2013.01); *B60K 28/16* (2013.01); *B60L 3/00* (2013.01); *B60L 3/102* (2013.01);
(Continued)

(58) Field of Classification Search
CPC .... B60L 3/00; B60L 3/10; B60L 3/102; B60L 3/106; B60L 9/18; B60L 11/18;
(Continued)

(56) References Cited

U.S. PATENT DOCUMENTS 5,453,930 A * 9/1995 Imaseki .................. B60L 15/20
701/22
5,757,161 A 5/1998 Ikkai et al.
(Continued)

FOREIGN PATENT DOCUMENTS

EP 2 777 982 A1 9/2014
JP 8-163702 6/1996
(Continued)

OTHER PUBLICATIONS

International Search Report dated May 16, 2017 in corresponding International Patent Application No. PCT/JP2017/004650.
(Continued)

*Primary Examiner* — Yonel Beaulieu

(57) ABSTRACT

Provided is a drive control device for a vehicle with independently driven wheels, the control device enabling the vehicle to avoid unstable behavior caused by an overrevolution of one of the drive wheels. The vehicle includes left and right motors (6, 6) that independently drive left and right drive wheels (2, 2), respectively. The control device includes: an ECU (21) to generate and output a command torque; an inverter device (22); rotation speed detection modules (34, 34) to detect the rotation speeds of the respective left and right motors (6, 6); and a control module (35) to change the command torques for the respective left and right motors (6, 6) so as to reduce the rotation speeds of the left and right motors (6, 6) when at least one rotation speed between the detected rotation speeds of the left and right motors (6, 6) exceeds a predetermined rotation speed.

6 Claims, 7 Drawing Sheets

(51) Int. Cl.
*B60L 7/22* (2006.01)
*B60L 3/08* (2006.01)
*B60K 1/02* (2006.01)
*B60L 9/18* (2006.01)
*B60L 15/20* (2006.01)
*B60L 3/00* (2019.01)
*B60T 8/175* (2006.01)
*B60W 30/18* (2012.01)
*B60K 28/16* (2006.01)

(52) U.S. Cl.
CPC ............... *B60L 7/10* (2013.01); *B60L 7/22* (2013.01); *B60L 9/18* (2013.01); *B60L 15/20* (2013.01); *B60T 8/175* (2013.01); *B60W 30/18127* (2013.01); *B60W 30/18172* (2013.01); *B60K 1/02* (2013.01); *Y02T 10/72* (2013.01)

(58) Field of Classification Search
CPC .... B60L 15/20; B60L 7/10; B60L 7/22; B60L 3/08; B60K 28/16; B60K 1/02; B60W 30/00; B60W 30/18127; B60W 30/18172; B60W 2520/26; B60W 2520/263; B60W 2520/266; B60T 8/00; B60T 8/175
See application file for complete search history.

(56) References Cited

U.S. PATENT DOCUMENTS

| | | | | |
|---|---|---|---|---|
| 6,615,940 B2* | 9/2003 | Morisawa | ............... | B60K 6/46 180/65.1 |
| 6,909,959 B2* | 6/2005 | Hallowell | ............... | B60K 6/52 701/88 |
| 7,279,855 B2* | 10/2007 | Tahara | ............... | B60K 6/26 318/46 |
| 8,113,307 B2* | 2/2012 | Holland | ............... | B60L 15/2036 180/65.1 |
| 9,067,507 B2* | 6/2015 | Makino | ............... | B60L 3/102 |
| 2006/0152180 A1* | 7/2006 | Tahara | ............... | B60K 6/26 318/139 |
| 2007/0187158 A1* | 8/2007 | Muta | ............... | B60K 6/445 180/65.1 |
| 2009/0159350 A1* | 6/2009 | Hanada | ............... | B60K 6/547 180/65.265 |
| 2010/0185351 A1* | 7/2010 | Uchiyama | ............... | B60K 6/365 701/22 |
| 2014/0288752 A1* | 9/2014 | Makino | ............... | B60L 15/2036 701/22 |
| 2016/0243943 A1 | 8/2016 | Sugai | | |

FOREIGN PATENT DOCUMENTS

| | | |
|---|---|---|
| JP | 8-223704 | 8/1996 |
| JP | 10-248107 | 9/1998 |
| JP | 2006-256454 | 9/2006 |
| JP | 2013-106390 | 5/2013 |
| JP | 2015-100149 | 5/2015 |
| WO | WO 2015/141520 A1 | 9/2015 |

OTHER PUBLICATIONS

Extended European Search Report dated Jul. 9, 2019 in corresponding European Patent Application No. 17750308.3.
Japanese Office Action dated Oct. 15, 2019 in corresponding Japanese Patent Application No. 2016-024414.
English Translation by WIPO of the International Preliminary Report on Patentability dated Aug. 23, 2018 in corresponding International Patent Application No. PCT/JP2017/004650, 6 pgs.

* cited by examiner

OVERREVOLUTION PREVENTION DETERMINATION

OVERREVOLUTION PREVENTION RESTORATION

DRIVE CONTROL DEVICE FOR VEHICLE WITH INDEPENDENTLY DRIVEN WHEELS

CROSS REFERENCE TO THE RELATED APPLICATION

This application is a continuation application, under 35 U.S.C. § 111(a), of international application No. PCT/JP2017/004650, filed Feb. 8, 2017, which claims Convention priority to Japanese patent application No. 2016-024414, filed Feb. 12, 2016, the entire disclosure of which is herein incorporated by reference as a part of this application.

BACKGROUND OF THE INVENTION

Field of the Invention

The present invention relates to a drive control device for a vehicle with independently driven wheels, and more specifically, relates to a technique which allows a vehicle to avoid unstable behavior caused by an overrevolution of one of a pair of left and right drive wheels.

Description of Related Art

The following techniques have been proposed in order to perform control for preventing an overrevolution of a traction motor in an electric vehicle.
1. Technique in which coasting or regeneration is performed when the rotation speed of a motor is not less than a predetermined value (Patent Document 1).
2. Technique in which a drive command for a motor is stopped and a power generation command is sent instead, when the rotation speed of the motor exceeds a maximum rotation rate (Patent Document 2).
3. Technique in which a torque command value is set to zero when the rotation speed of a motor exceeds a first predetermined value, and the torque command value is restored when the rotation speed of the motor becomes not greater than a second predetermined value, and in which the torque is gradually reduced by a delay process while the rotation speed of the motor is between the first and second predetermined values, when the torque command value is set to zero (Patent Document 3).

In a case where an overrevolution of an engine is prevented, increase in the rotation speed is suppressed by stopping ignition or fuel injection, or reducing the number of times of ignition or fuel injection when a predetermined rotation speed is exceeded. On the other hand, in order to prevent an overspeed of a motor, increase in the rotation speed is suppressed by reducing a command torque to the motor such that the command torque becomes zero or a regenerative torque is applied.

RELATED DOCUMENT

Patent Document

[Patent Document 1] JP Laid-open Patent Publication No. H08-163702
[Patent Document 2] JP Laid-open Patent Publication No. H08-223704
[Patent Document 3] JP Laid-open Patent Publication No. H10-248107

SUMMARY OF THE INVENTION

However, in a vehicle that drives left and right wheels independently of each other, a difference in rotation speed between the left and right wheels can be generated. For example, while such a vehicle is turning, a difference in rotation speed between the inner wheel and the outer wheel is generated owing to a difference therebetween in the turning radius. In addition, such a difference in rotation speed is generated owing to also a difference of the diameters of tires due to a difference in wear or pneumatic pressure between the tires. Thus, the rotation speeds of the left and right wheels are often not equal to each other. In the vehicle that drives the left and right wheels independently of each other, when overrevolution prevention control is individually performed on the rotation speeds of motors, in only one of the wheels, torque may drop or be released, or regenerative braking may be caused, and thereafter, the torque may be restored. Accordingly, unexpected yaw moment can be generated on the vehicle, which causes the vehicle to behave unstably.

Patent Documents 1 to 3 each disclose a technique in which the torque command is made zero or the regenerative torque is applied. However, in each of Patent Documents 1 to 3, a single motor is used, and a case is not assumed where left and right wheels are driven independently of each other by separate motors. If the techniques of Patent Documents 1 to 3 are applied to a vehicle including left and right motors for individually driving left and right drive wheels, unexpected yaw moment is generated on the vehicle owing to such a difference in rotation speed between the left and right wheels as aforementioned, and the vehicle may behave unstably.

An object of the present invention is to provide a drive control device for a vehicle with independently driven wheels, the drive control device enabling the vehicle to avoid unstable behavior caused by an overrevolution of one of the drive wheels.

Hereinafter, for convenience of easy understanding, a description will be given with reference to the reference numerals in embodiments.

A drive control device for a vehicle with independently driven wheels according to one aspect of the present invention, the vehicle being equipped with the drive control device, the vehicle including left and right motors 6, 6 that individually drive left and right drive wheels 2, 2, and includes:

an ECU 21 configured to generate and output a command torque;

an inverter device 22 (22A) having a power circuit unit 28 and a motor control module 29, the power circuit unit 28 including an inverter 31 configured to convert DC power into AC power, the motor control module 29 being configured to perform torque control of the motor 6 via the power circuit unit 28 in accordance with the command torque supplied from the ECU 21;

left and right rotation speed detection modules 34, 34 configured to detect rotation speeds of the respective left and right motors 6, 6; and an overrevolution prevention control module 35 configured to change the command torques for the respective left and right motors 6, 6 so as to reduce the rotation speeds of the left and right motors 6, 6 when at least one of the rotation speeds of the left and right motors 6, 6 detected by the left and right rotation speed detection modules 34, 34 exceeds a predetermined rotation speed.

The predetermined rotation speed is any rotation speed determined through designing, etc., and is determined by obtaining an appropriate rotation speed through, for example, a test and/or a simulation.

In this specification, the "rotation speed" is synonymous with the number of revolution per unit time.

In this configuration, the left and right rotation speed detection modules 34, 34 detect the rotation speeds of the respective left and right motors 6, 6. The overrevolution prevention control module 35 determines whether or not at least one of the detected rotation speeds of the respective left and right motors 6, 6 has exceeded the predetermined rotation speed. When determining that the at least one rotation speed has exceeded the predetermined rotation speed, the overrevolution prevention control module 35 changes the command torque for the respective left and right motors 6, 6 so as to reduce the rotation speeds of the left and right motors 6, 6.

Conventionally, overrevolution prevention control is performed on the left and right motors in accordance with the respective rotation speeds, and thus, the torque of only a motor having the higher rotation speed drops or is released, which can generate unexpected yaw moment on the vehicle and cause the vehicle to behave unstably.

On the other hand, in this configuration, when for example a motor rotation speed which is the higher between the rotation speeds of the left and right motors 6, 6 exceeds the predetermined rotation speed, increase in both rotation speeds of the left and right motors 6, 6 is suppressed by, for example, reducing the command torques for the left and right motors 6, 6 driving the respective left and right drive wheels 2, 2, during a period in which the rotation speed is higher than the predetermined rotation speed. In this case, a trouble such as one in which the torque of only one of the wheels drops or is released is prevented in advance, whereby unexpected yaw moment can be prevented from being generated on the vehicle. Therefore, unstable behavior of the vehicle is avoided.

The rotation speed detection module may be included in the inverter. The overrevolution prevention control module may be included in the ECU or the inverter device.

The overrevolution prevention control module 35 may perform control in which the command torques for the respective left and right motors 6, 6 are reduced with elapse of time, during a period in which at least one of the rotation speeds of the left and right motors 6, 6 is higher than the predetermined rotation speed. In this case, increase in the rotation speeds of the left and right motors 6, 6 can be reliably and easily suppressed.

The overrevolution prevention control module 35 may perform control in which the command torques for the respective left and right motors 6, 6 are eventually reduced to zero. In this case, the control in which the command torques are changed can be easily performed.

The overrevolution prevention control module 35 may perform control in which the command torques for the respective left and right motors 6, 6 are reduced with elapse of time, and, in a case where at least one of the rotation speeds is higher than the predetermined rotation speed even after the command torques are reduced to zero, regenerative torques are applied to the left and right motors 6, 6. When the control in which the regenerative torques are applied to the left and right motors 6, 6 is thus performed, the rotation speeds of the left and right motors 6, 6 can be more certainly reduced.

The overrevolution prevention control module 35 may increase the command torques for the respective left and right motors 6, 6 such that the command torques are returned to a desired command torque, when both rotation speeds of the left and right motors 6, 6 detected by the left and right rotation speed detection modules 34, 34 become equal to or lower than the predetermined rotation speed.

The desired command torques are the command torques having not yet been changed by the overrevolution prevention control module 35 (just before the change), for the respective left and right motors 6, 6. For example, from an acceleration command and a deceleration command, acceleration and deceleration commands to be given to the left and right motors 6, 6 are generated. Command torques, for the respective left and right motors 6, 6, corresponding to the desired command torques are obtained from the acceleration and deceleration commands, etc.

In this configuration, the torques of the left and right drive wheels 2, 2 are restored at the same time, and thus, unexpected yaw moment can be prevented from being generated on the vehicle, which can keep the vehicle stable.

The overrevolution prevention control module may change the command torques for the respective left and right motors by approximately equal degrees with elapse of time.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

A first embodiment of the present invention will be described with reference to FIG. 1 to FIG. 6.

Figure 1:
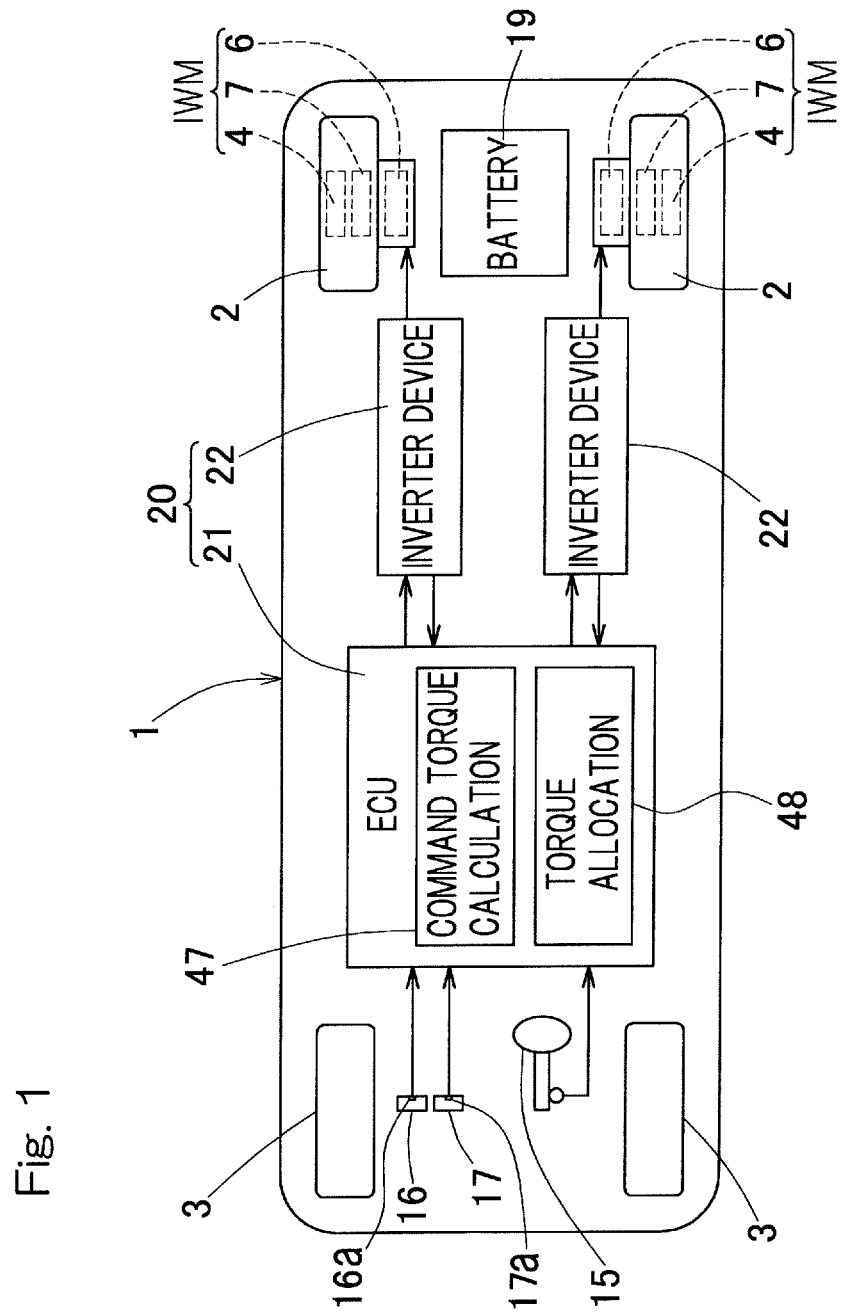
FIG. 1 is a block diagram of a schematic configuration of an electric vehicle, as viewed from the top, that is equipped with a drive control device according to a first embodiment of the present invention.

FIG. 1 is a block diagram of a schematic configuration of an electric vehicle, as viewed from the top, that is a vehicle equipped with a drive control device according to this embodiment. The electric vehicle is a four-wheel vehicle or an automobile. The electric vehicle includes a vehicle body 1, in which left and right rear wheels are drive wheels 2, 2 and left and right front wheels are driven wheels 3, 3. The front wheels 3, 3 are steered wheels. The left and right front wheels 3, 3 can be turned via a turning mechanism not shown, and are steered through a steering device 15 such as a steering wheel. The left and right drive wheels 2, 2 are driven by respective independent traction motors 6, 6. Each motor 6 constitutes an in-wheel motor drive device IWM described below. Each of the wheels 2, 3 is provided with a brake not shown.

Figure 2:
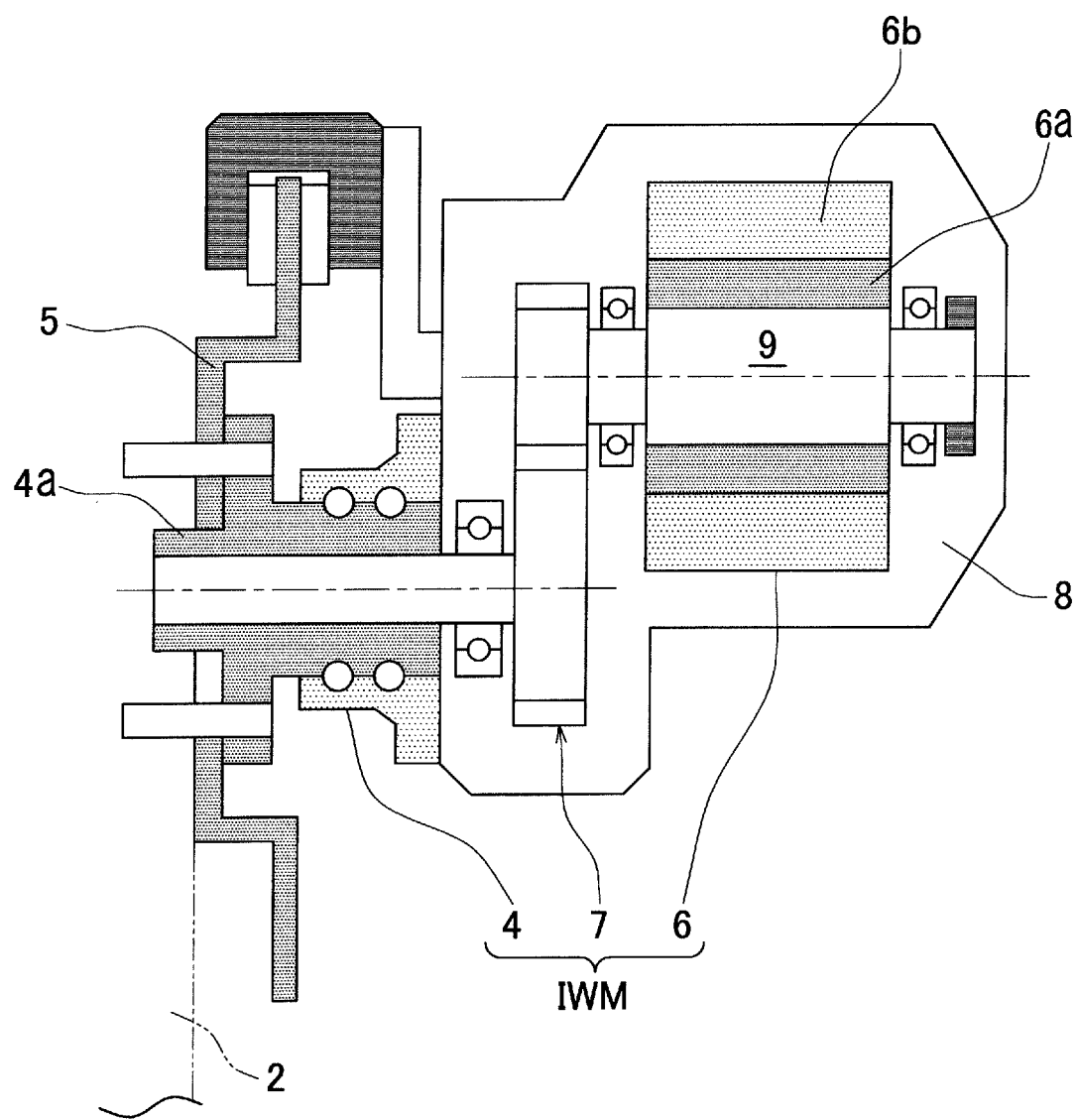
FIG. 2 is a cross-sectional view of an in-wheel motor drive device in the electric vehicle in FIG. 1.

FIG. 2 is a cross-sectional view of the in-wheel motor drive device IWM in the electric vehicle, Each in-wheel motor drive device IWM includes the motor 6, a speed reducer 7, and a wheel bearing 4, and some of or all of them are disposed in the wheel. Rotation of the motor 6 is transmitted to the drive wheel 2 via the speed reducer 7 and the wheel bearing 4. A brake rotor 5 constituting the brake is fixed to a flange portion of a hub ring 4a of the wheel bearing 4. The brake rotor 5 is rotated together with the drive wheel 2. The motor 6 is, for example, an interior permanent magnet synchronous motor in which a permanent magnet is embedded in a core portion of a rotor 6a. The motor 6 includes a stator 6b fixed to a housing 8 and the rotor 6a mounted to a rotational output shaft 9, between which a radial gap is formed.

A control system will be described.

As shown in FIG. 1, the vehicle body 1 is equipped with a drive control device 20. The drive control device 20 includes an ECU 21 and a plurality (two in this example) of inverter devices 22. In this embodiment, the two inverter devices 22 are physically separate from each other so as to have a separate structure, and are mounted on the vehicle body 1. These inverter devices 22 are associated with the respective motors 6. The ECU 21 is a high-level control means configured to perform general integrated control of the automobile and to provide each inverter device 22 with a command. Each inverter device 22 performs control of the corresponding traction motor 6 in accordance with the command from the ECU 21. The ECU 21 is implemented by a computer, a program executed by the computer, various electronic circuits, and the like.

The ECU 21 includes a command torque calculation module 47 and a torque allocation module 48. Mainly from a signal that indicates an accelerator position and that is outputted through an accelerator manipulation device 16 and from a deceleration command outputted through a brake manipulation device 17, the command torque calculation module 47 generates, as command torques, acceleration/deceleration commands to be supplied to the traction motors 6, 6 for the left and right drive wheels 2, 2. The torque allocation module 48 outputs the acceleration/deceleration command values calculated by the command torque calculation module 47 to the respective inverter devices 22 so as to allocate the values to the traction motors 6, 6 for the left and right wheels 2, 2, considering a turning command outputted by a steering angle sensor that is not shown and that detects the steering angle of the steering device 15.

In addition, the command torque calculation module 47 has a function to, when the deceleration commands are outputted thereto through the brake manipulation device 17, allocate the deceleration commands as: braking torque command values for causing the motors 6 to function as regenerative brakes; and braking torque command values for the brakes not shown. The braking torque command values for causing the motors 6 to function as regenerative brakes are reflected in command torque values of the acceleration/deceleration commands to be supplied to the respective traction motors 6, 6. The accelerator manipulation device 16 and the brake manipulation device 17 respectively include an accelerator pedal and a brake pedal, and respectively include an acceleration sensor 16a and a brake sensor 17a for detecting the amounts of operations of the respective pedals. A battery 19 is mounted to the vehicle body 1, and is used as a power supply for driving the motors 6 and for an electrical system of the entire vehicle.

Figure 3:
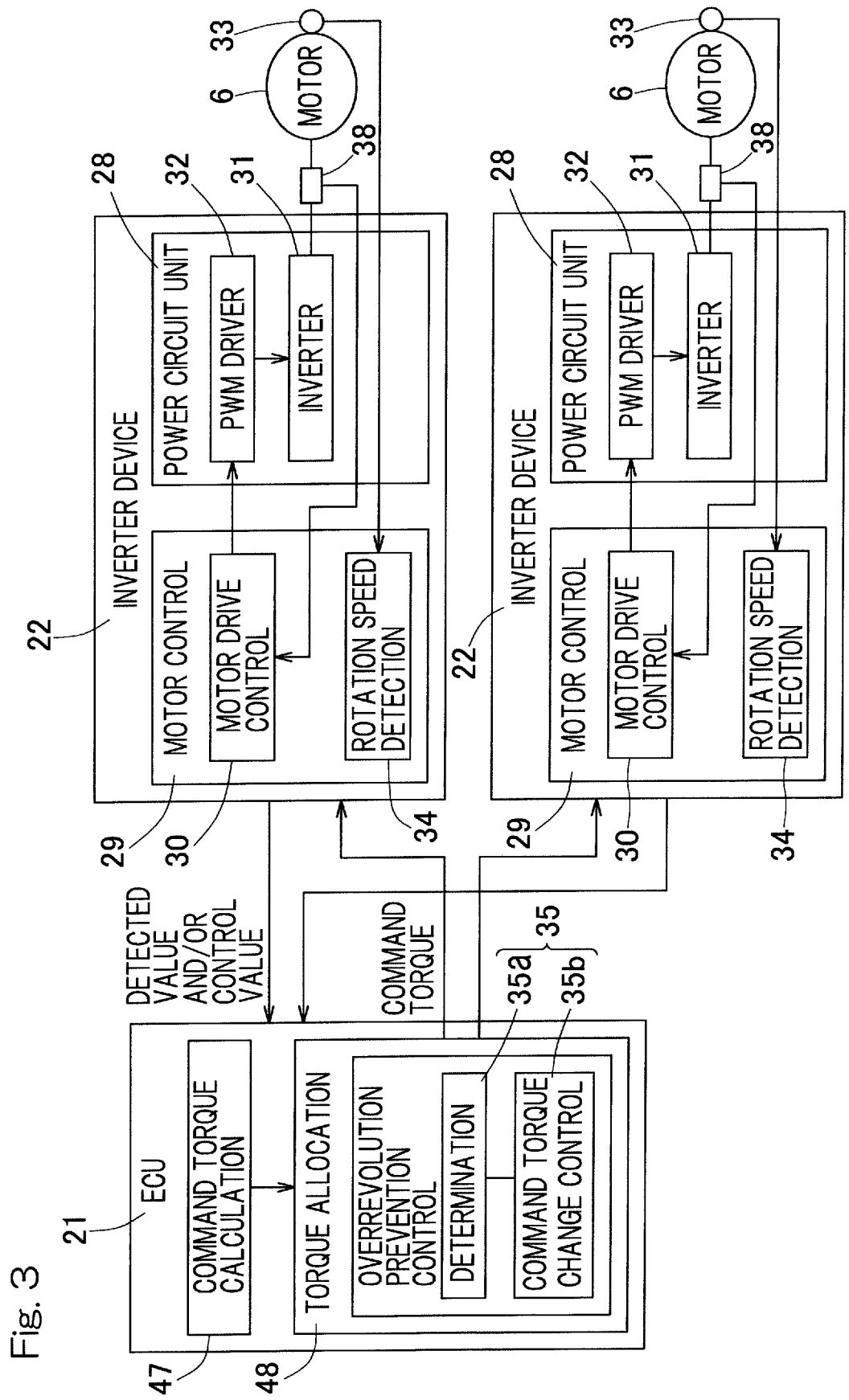
FIG. 3 is a block diagram of a control system of the drive control device in FIG. 1.

FIG. 3 is a block diagram of the control system of the drive control device.

Each inverter device 22 includes: a power circuit unit 28 provided for the corresponding motor 6; and a motor control module 29 for controlling the power circuit unit 28. The motor control module 29 holds various kinds of information, about the corresponding in-wheel motor drive device IWM, such as detected values and/or control values (e.g., control torque, motor rotation speed, to and/or other control information). These kinds of information are outputted to the ECU 21.

The power circuit unit 28 includes an inverter 31 and a PWM driver 32 for driving the inverter 31. The inverter 31 converts DC power of the battery 19 (FIG. 1) to three-phase AC power used for driving the motor 6. The inverter 31 includes a plurality of semiconductor switching elements not shown, and the PWM driver 32 drives the inverter 31 by an on/off command. Each semiconductor switching element is implemented by an insulated-gate bipolar transistor (IGBT), for example.

The motor control module 29 includes: a motor drive control module 30, which serves as the basis for a control module; and a rotation speed detection module 34, which detects the rotation speed of the corresponding motor 6. The motor drive control module 30 converts, into a current command, the acceleration/deceleration command value that is a command torque and that has been supplied from the ECU 21, and obtains, from a current sensor 38, a motor current flowing from the inverter 31 to the motor 6, thereby performing current feedback control (control based on a control signal). The motor control module 29 calculates a voltage command through the current feedback control and supplies the voltage command to the PWM driver 32. The PWM driver 32 performs pulse width modulation of the voltage command, to supply the on/off command to semiconductor switching elements of the corresponding inverter 31.

The rotation speed detection module 34 obtains a rotation angle of the rotor 6a (FIG. 2) of the motor 6 from a rotation angle sensor 33, and calculates a rotation speed of the motor 6 by means of, for example, differentiation of the rotation angle or a state assumption observer, etc., based on physical equations, etc. As the rotation angle sensor 33, for example, a resolver or the like is used. The rotation speeds of the left and right motors 6, 6 detected by the left and right rotation speed detection modules 34, 34 associated with the respective left and right motors 6, 6 are used for determination as to overrevolution, in the overrevolution prevention control module 35.

In this embodiment, the overrevolution prevention control module 35 is provided in the torque allocation module 48 of the ECU 21. The overrevolution prevention control module 35 includes a determination module 35*a* and a command torque change control module 35*b*. The determination module 35*a* constantly determines whether or not at least one rotation speed between the rotation speeds of the left and right motors 6, 6 detected by the left and right rotation speed detection modules 34, 34 has exceeded a predetermined rotation speed. The predetermined rotation speed is any rotation speed determined through designing, etc., and is determined by obtaining an appropriate rotation speed through, for example, a test and/or a simulation. The predetermined rotation speed is about 8000 rpm, for example, but is not limited to this rotation speed.

The command torque change control module 35*b* changes the command torques for the left and right motors 6, 6 so as to reduce the rotation speeds of the left and right motors 6, 6 when the determination module 35*a* determines that at least one rotation speed between the rotation speeds of the left and right motors 6, 6 has exceeded the predetermined rotation speed. Specifically, the command torque change control module 35*b* performs control in which the command torques for the left and right motors 6, 6 are reduced with elapse of time, during a period in which at least one rotation speed between the rotation speeds of the left and right motors 6, 6 is higher than the predetermined rotation speed.

When the determination module 35*a* determines that both rotation speeds of the left and right motors 6, 6 are equal to or lower than the predetermined rotation speed during execution of the aforementioned control in which the command torques are reduced, the command torque change control module 35*b* performs control in which the command torques for the left and right motors 6, 6 are increased with elapse of time such that the command torques are restored, that is, the command torques are returned to the desired command torques. The desired command torques are command torques, for the respective left and right motors 6, 6, that are generated by the command torque calculation module 47 and allocated to the respective motors 6 and that are the command torques having not yet been changed by the overrevolution prevention control module 35 (just before the change).

Figure 4:
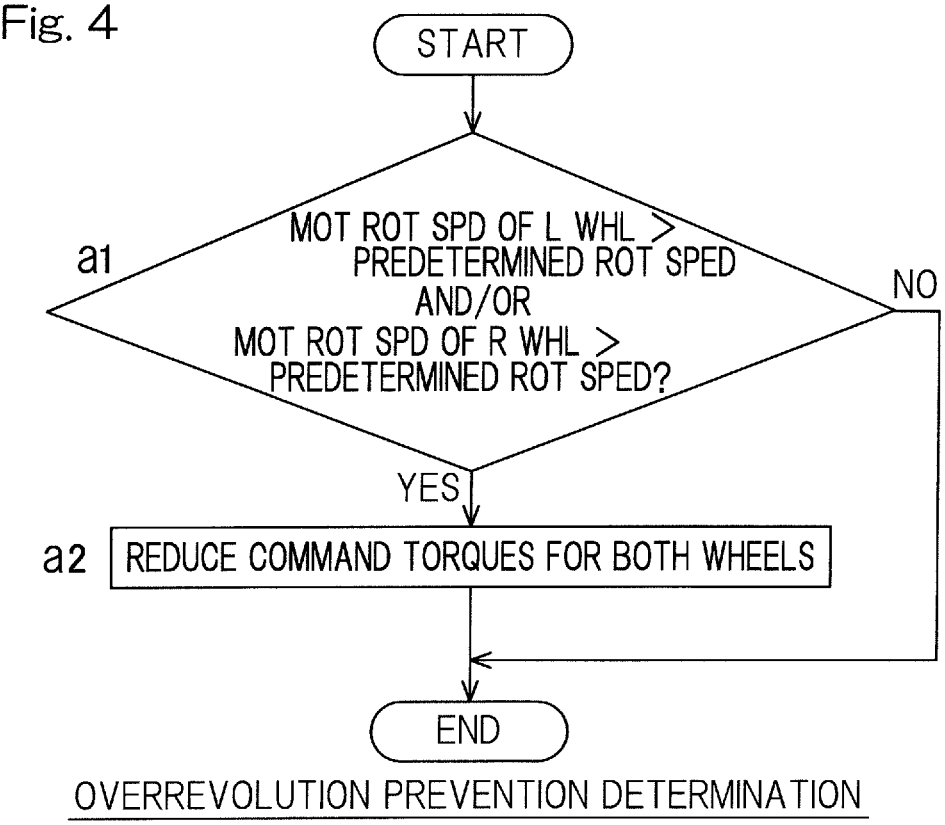
FIG. 4 is a flowchart indicating a determination process in overrevolution prevention control by the drive control device in FIG. 1.

FIG. 4 is a flowchart indicating a determination process in the overrevolution prevention control by the drive control device. With reference to FIG. 3 and FIG. 4, this process is started under, for example, a condition that a main power supply of the vehicle is turned on, and the determination module 35*a* of the overrevolution prevention control module 35 determines whether or not the motor rotation speed of the left wheel has exceeded the predetermined rotation speed and whether or not the motor rotation speed of the right wheel has exceeded the predetermined rotation speed (step a1). Regarding the determination as to these left and right wheels, at a time when the motor rotation speed of one of the wheels is determined to have exceeded the predetermined rotation speed, the determination as to the other wheel may be omitted. When neither of the motor rotation speeds of the left wheel and the right wheel is determined to have exceeded the predetermined rotation speed (No in step a1), this process is ended. When at least one of the rotation speeds is determined to have exceeded the predetermined rotation speed (Yes in step a1), the command torque change control module 35*b* of the overrevolution prevention control module 35 gradually reduces the command torques for the left and right motors 6, 6 (step a2). Thereafter, this process is ended.

Figure 5:
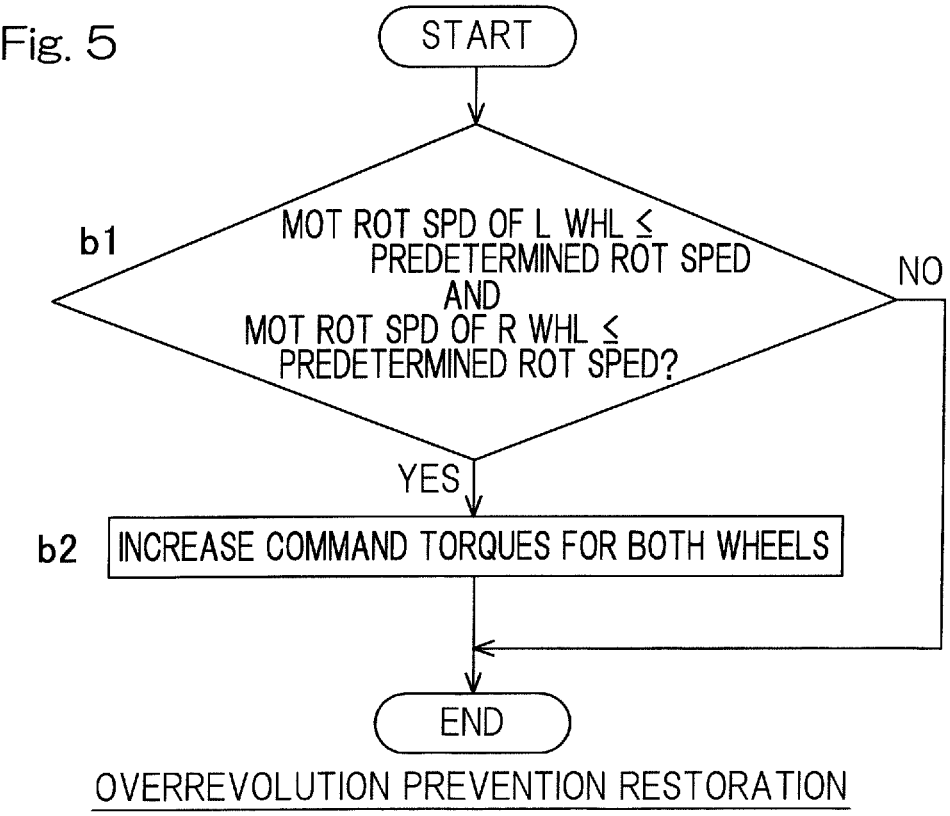
FIG. 5 is a flowchart indicating a restoration process in the overrevolution prevention control by the drive control device in FIG. 1.

FIG. 5 is a flowchart indicating a restoration process in the overrevolution prevention control by the drive control device. With reference to FIG. 3 and FIG. 5, during execution of the aforementioned control in which the command torques are reduced, the determination module 35*a* determines whether or not the motor rotation speed of the left wheel is equal to or lower than the predetermined rotation speed and the motor rotation speed of the right wheel is equal to or lower than the predetermined rotation speed (step b1). When neither of the motor rotation speeds is determined to be equal to or lower than the predetermined rotation speed (No in step b1), this process is ended. When both motor rotation speeds are determined to be equal to or lower than the predetermined rotation speed (Yes in step b1), the command torque change control module 35*b* gradually increases the command torques for the left and right motors 6, 6 (step b2). Thereafter, this process is ended.

Figure 6:
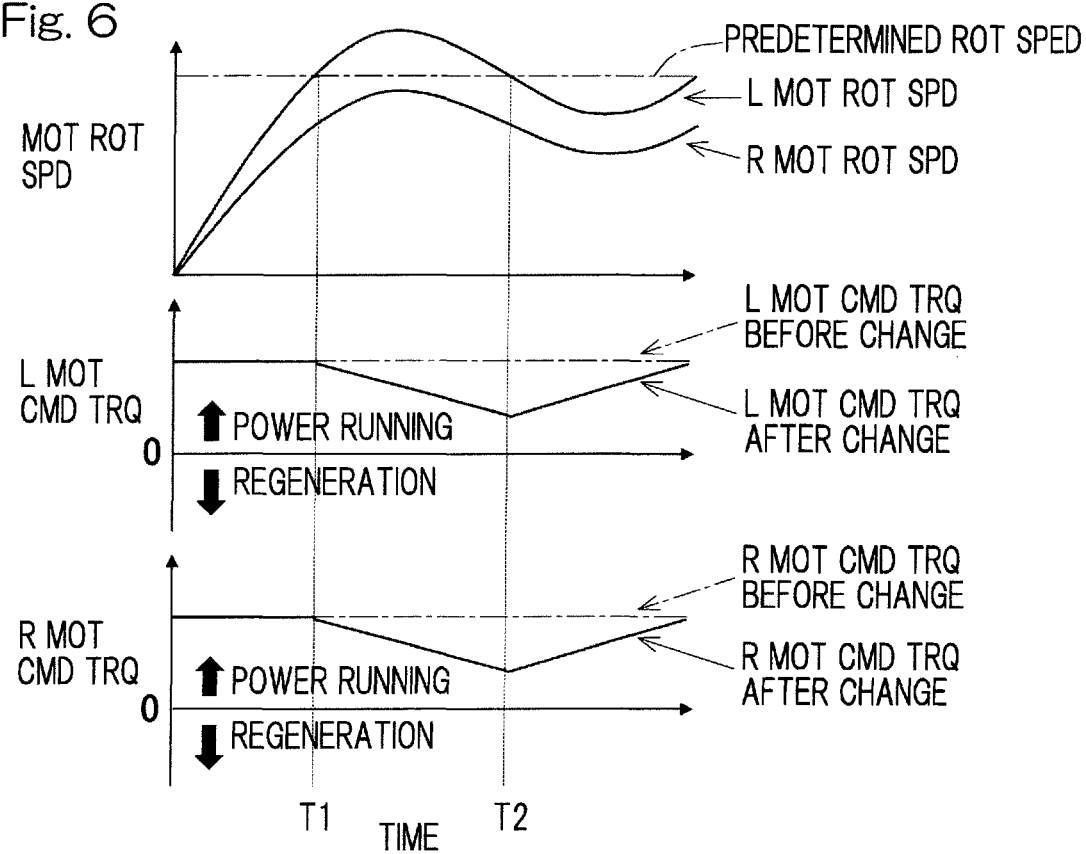
FIG. 6 shows diagrams indicating the relationship between motor rotation speed and motor command torque during the overrevolution prevention control by the drive control device in FIG. 1.

FIG. 6 shows diagrams indicating the relationship between motor rotation speed and motor command torque during the overrevolution prevention control. This drawing will be described with reference to FIG. 3. The command torques in the example in FIG. 6 are command torques according to power running control in which driving torques in a vehicle frontward travelling direction are applied to the respective wheels. When the determination module 35*a* determines that the rotation speed of the left motor 6 has exceeded the predetermined rotation speed at a time point T1, the command torque change control module 35*b* gradually reduces the command torques for the left and right motors 6, 6 from the time point T1.

The rotation speed of the right motor 6 does not exceed the predetermined rotation speed at the time point T1 in this example. The degrees of reduction in the command torques are approximately equal to each other between the command torques for the left and right motors 6, 6. The command torque change control module 35*b* gradually reduces the command torques for the left and right motors 6, 6 such that the command torques linearly decrease with elapse of time. Even though the rotation speed of the right motor 6 has not exceeded the predetermined rotation speed, the command torque is gradually reduced similarly to the case of the left motor 6.

Thereafter, when the determination module 35*a* determines that the rotation speed of the left motor 6 falls below the predetermined rotation speed at a time point T2, since the rotation speed of the right motor 6 is changing in a state of being equal to or lower than the predetermined rotation speed, the command torque change control module 35*b* gradually increases, from the time point T2, the command torques for the left and right motors 6, 6 such that the command torques are returned to command torques that have not been changed. The degrees of increase in the command torques are approximately equal to each other between the command torques for the left and right motors 6, 6. The command torque change control module 35*b* gradually increases the command torques for the left and right motors 6, 6 such that the command torques linearly increase with elapse of time, thereby returning the command torques to the respective command torques that have not been changed (desired command torques).

Effects will be described.

According to the drive control device 20 described above, when for example a motor rotation speed which is the higher between the rotation speeds of the left and right motors 6, 6 exceeds the predetermined rotation speed, increase in both rotation speeds of the left and right motors 6, 6 is suppressed by gradually reducing the command torques for the left and right motors 6, 6, during a period in which the rotation speed is higher than the predetermined rotation speed. In this case, a trouble such as one in which the torque of only one of the wheels drops or is released is prevented in advance, whereby unexpected yaw moment can be prevented from being generated on the vehicle. Therefore, unstable behavior of the vehicle is avoided. In addition, since the command torques for the left and right motors 6, 6 are reduced with elapse of time, increase in the rotation speeds of the left and right motors 6, 6 can be reliably and easily suppressed.

When both rotation speeds of the left and right motors 6, 6 become equal to or lower than the predetermined rotation speed, the overrevolution prevention control module 35 increases the command torques for the left and right motors 6, 6 such that the command torques are returned to the desired command torques. In this case, the torques of the left and right drive wheels 2, 2 are restored at the same time, and thus, unexpected yaw moment can be prevented from being generated on the vehicle, which can keep the vehicle stable.

A second embodiment will be described. Except for control by the command torque change control module 35b described below, the other features of a drive control device according to this embodiment are the same as those of the drive control device according to the first embodiment.

Figure 7:
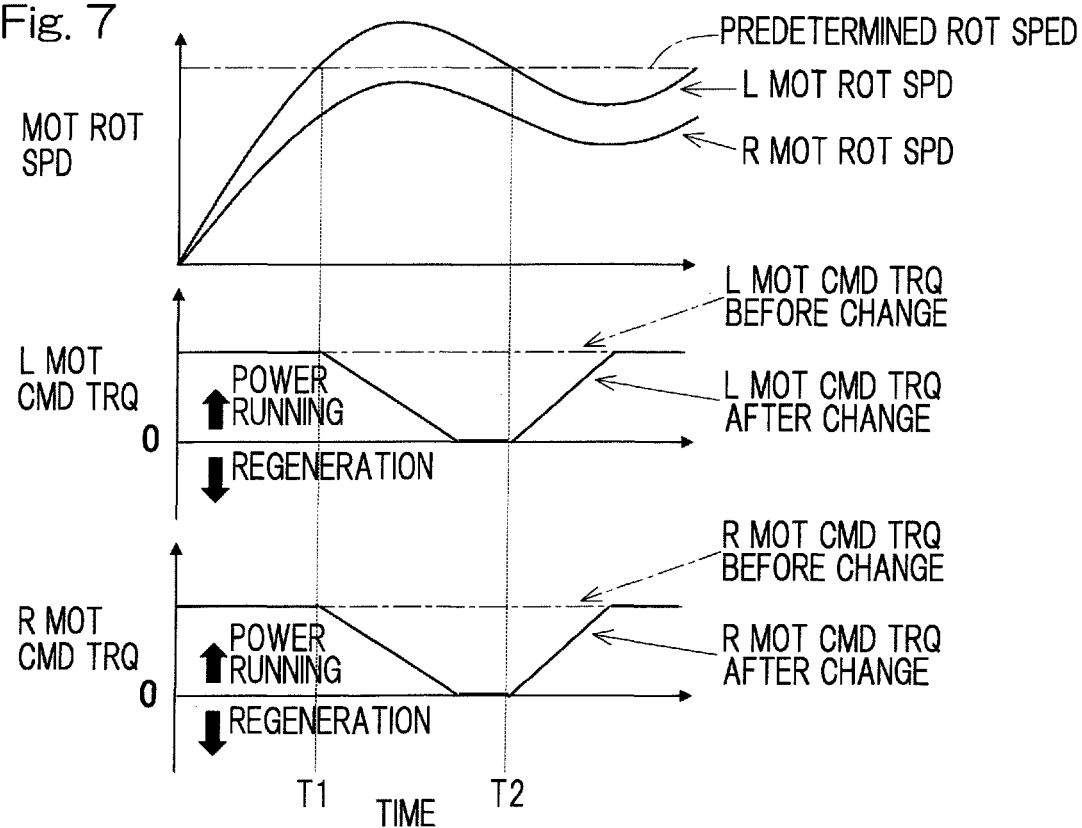
FIG. 7 shows diagrams indicating the relationship between motor rotation speed and motor command torque during overrevolution prevention control by a drive control device according to a second embodiment of the present invention.

With reference to FIG. 7 and FIG. 3, when the determination module 35a determines that the rotation speed of the left motor 6 has exceeded the predetermined rotation speed at the time point T1, the command torque change control module 35b of the overrevolution prevention control module 35 may perform adjustment control in which the command torques for the left and right motors 6, 6 are gradually reduced to be eventually reduced to zero. In this case, increase in the rotation speeds of the left and right motors 6, 6 can be reliably and easily suppressed. Thereafter, the command torque change control module 35b of the overrevolution prevention control module 35 maintains the command torques for the left and right motors 6, 6 at "zero", and, when the determination module 35a determines that both rotation speeds of the left and right motors 6, 6 are equal to or lower than the predetermined rotation speed at the time point T2, gradually increases the command torques for the left and right motors 6, 6 such that the command torques are returned to the command torques that have not been changed (desired command torques).

A third embodiment will be described. Except for control by the command torque change control module 35b described below, the other features of a drive control device according to this embodiment are the same as those of the drive control devices according to the first and second embodiments.

Figure 8:
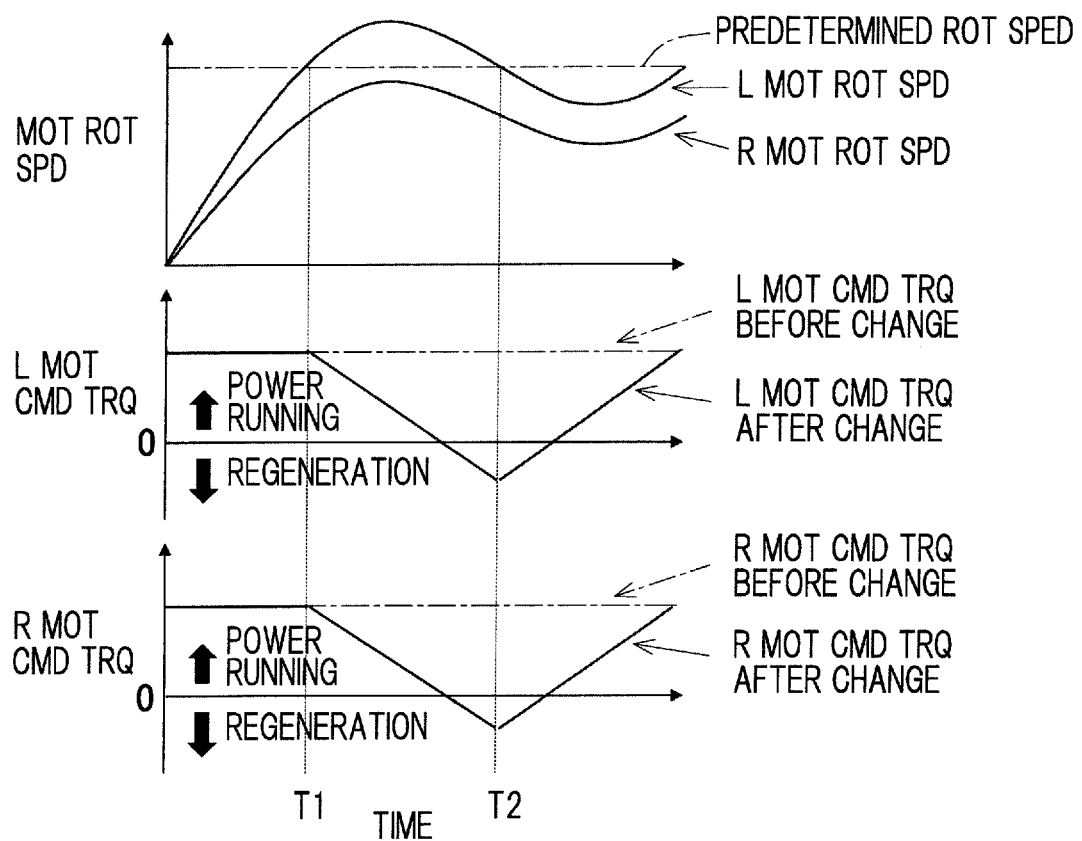
FIG. 8 shows diagrams indicating the relationship between motor rotation speed and motor command torque during overrevolution prevention control by a drive control device according to a third embodiment of the present invention.

With reference to FIG. 8 and FIG. 3, when the determination module 35a determines that the rotation speed of the left motor 6 has exceeded the predetermined rotation speed at the time point T1, the command torque change control module 35b of the overrevolution prevention control module 35 may perform control in which the command torques for the left and right motors 6, 6 are gradually reduced, and, in a case where at least one of the rotation speeds is higher than the predetermined rotation speed even after the command torques become "zero", regenerative torques are applied to the left and right motors 6, 6. When the control in which the regenerative torques are applied to the left and right motors 6, 6 is thus performed, the rotation speeds of the left and right motors 6, 6 can be more certainly reduced. Thereafter, when the determination module 35a determines that both rotation speeds of the left and right motors 6, 6 are equal to or lower than the predetermined rotation speed at the time point T2, the command torque change control module 35b of the overrevolution prevention control module 35 gradually increases the command torques for the left and right motors 6, 6 such that the command torques are returned to the command torques that have not been changed (desired command torques).

A fourth embodiment will be described. In the following description, the components corresponding to the matters described in each of the preceding embodiments are denoted by like reference numerals, and any redundant description has been omitted. When only a part of a configuration is described, the remaining part of the configuration is the same as that of the previously described embodiments unless otherwise specified. The same advantageous effects are achieved by the same configuration. In addition to the combinations of portions described specifically in each embodiment, it is also possible to partially combine the embodiments unless any problem is particularly posed due to the combination.

Figure 9:
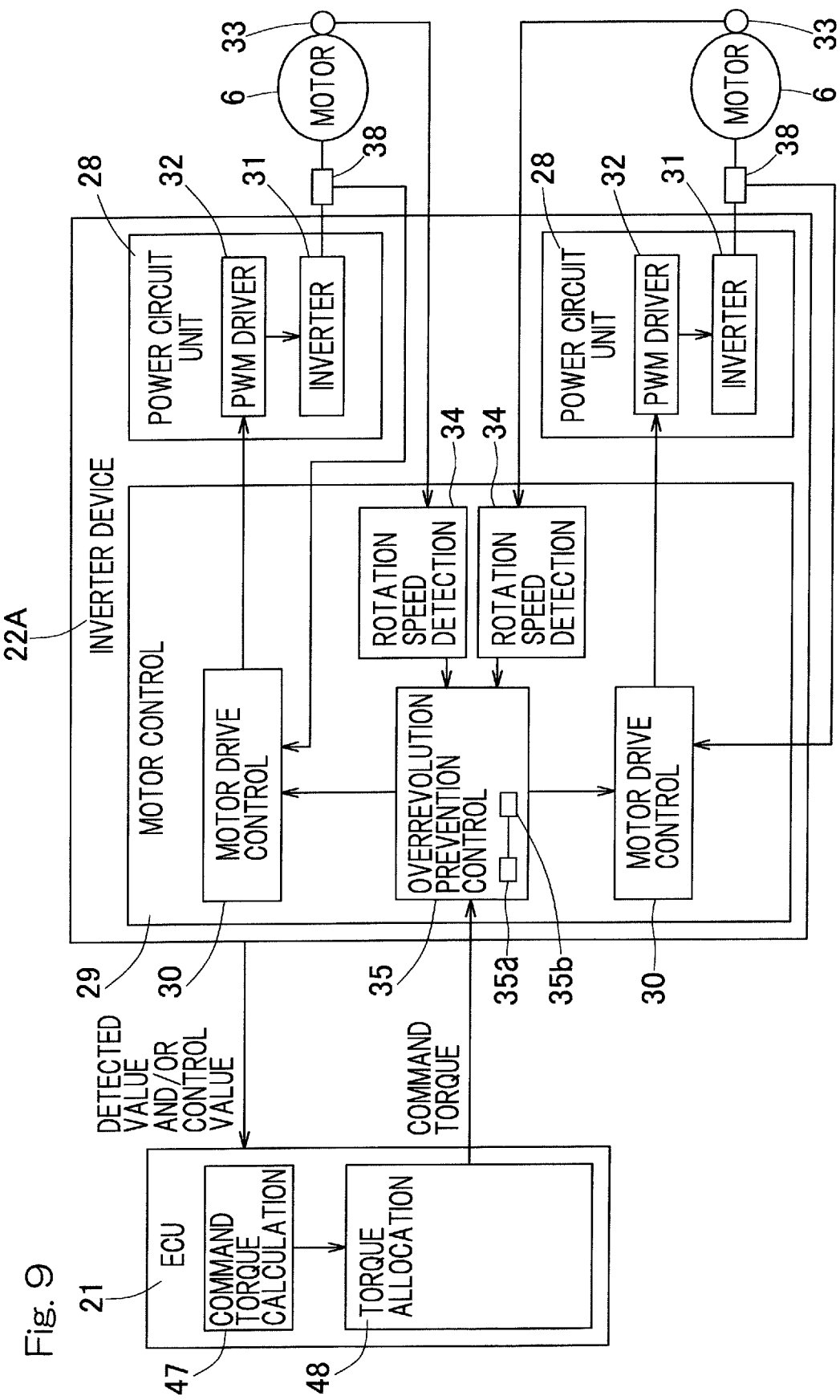
FIG. 9 is a block diagram of a control system of a drive control device according to a fourth embodiment of the present invention.

As shown in FIG. 9, a configuration may be employed in which, for the left and right motors 6, 6, a single inverter device 22A is mounted on the vehicle body 1 (FIG. 1). The inverter device 22A in this example includes a single motor control module 29 and two power circuit units 28, 28 corresponding to the respective motors 6. In the first embodiment described with reference to FIG. 3, the overrevolution prevention control module 35 is provided to the torque allocation module 48 of the ECU 21. However, in this embodiment, the overrevolution prevention control module 35 is provided to the motor control module 29 of the inverter device 22A. The other components are the same as described above and the same advantageous effects are achieved.

The vehicle may be a two-wheel independent drive vehicle, which drives two left and right front wheels independently of each other. Alternatively, the vehicle may be a four-wheel independent drive vehicle, which drives two left and right front wheels independently of each other and drives two left and right rear wheels independently of each other.

The in-wheel motor drive device may include a cycloidal speed reducer, a planetary speed reducer, a speed reducer with two parallel shafts, or another speed reducer. Alternatively, the in-wheel motor drive device may be of a so-called direct motor type in which no speed reducer is used.

The overrevolution prevention control module may gradually reduce the command torques for the left and right motors such that the command torques drop with elapse of time so as to, for example, form a curve in a shape of a predetermined quadratic curve. Alternatively, the overrevolution prevention control module may gradually reduce both command torques so as to combine the shape of the quadratic curve and a linear shape.

When increasing the command torques for the left and right motors with elapse of time, the overrevolution prevention control module may increase the command torques such that the command torques increase so as to, for example, form a curve in a shape of a predetermined quadratic curve. Alternatively, the overrevolution prevention control module may gradually increase both command torques so as to combine the shape of the quadratic curve and a linear shape.

Although the modes for carrying out the present invention have been described on the basis of the embodiments, the embodiments disclosed herein are illustrative in all aspects and not restrictive. The scope of the present invention is indicated not by the above description but by the claims, and is intended to include any modifications within the scope and meaning equivalent to the claims.

REFERENCE NUMERALS

2 . . . drive wheel
6 . . . motor
20 . . . drive control device
21 . . . ECU
22, 22A . . . inverter device
28 . . . power circuit unit
29 . . . motor control module
31 . . . inverter
34 . . . rotation speed detection module
35 . . . overrevolution prevention control module

What is claimed is:

1. A drive control device for a vehicle, the vehicle being equipped with the drive control device, the vehicle including left and right motors that independently drive left and right drive wheels, respectively, the drive control device comprising:
    an ECU configured to generate and output a command torque;
    an inverter device having a power circuit unit and a motor controller, the power circuit including an inverter configured to convert DC power into AC power, the motor controller being configured to perform torque control of the motor via the power circuit unit in accordance with the command torque supplied from the ECU;
    left and right rotation speed detectors configured to detect rotation speeds of the respective left and right motors; and
    an overrevolution prevention controller configured to change the command torques for the respective left and right motors so as to reduce the rotation speeds of the left and right motors when at least one of the rotation speeds of the left and right motors detected by the left and right rotation speed detectors exceeds a predetermined rotation speed.

2. The drive control device as claimed in claim 1, wherein the overrevolution prevention controller performs control in which the command torques for the respective left and right motors are reduced with elapse of time, during a period in which at least one of the rotation speeds of the left and right motors is higher than the predetermined rotation speed.

3. The drive control device as claimed in claim 2, wherein the overrevolution prevention controller performs control in which the command torques for the respective left and right motors are reduced to zero.

4. The drive control device as claimed in claim 2, wherein the overrevolution prevention controller performs control in which the command torques for the respective left and right motors are reduced with elapse of time, and, in a case where at least one of the rotation speeds is higher than the predetermined rotation speed even after the command torques are reduced to zero, regenerative torques are applied to the left and right motors.

5. The drive control device as claimed in claim 1, wherein the overrevolution prevention controller increases the command torques for the respective left and right motors such that the command torques are returned to a desired command torque, when both rotation speeds of the left and right motors detected by the left and right rotation speed detector become equal to or lower than the predetermined rotation speed.

6. The drive control device as claimed in claim 1, wherein the overrevolution prevention controller changes the command torques for the respective left and right motors by approximately equal degrees with elapse of time.

* * * * *